US012785752B2

(12) United States Patent
Ke et al.

(10) Patent No.: US 12,785,752 B2
(45) Date of Patent: Nov. 3, 2026

(54) COMMUNICATION CIRCUIT BETWEEN EMERGENCY POWER SUPPLY AND CONVENTIONAL POWER SUPPLY

(71) Applicant: SHENZHEN BILLDA TECHNOLOGY CO.,LTD, Shenzhen (CN)

(72) Inventors: Jianjun Ke, Shenzhen (CN); Peizhi Chen, Shenzhen (CN); Xiaobing Liu, Shenzhen (CN); Qiu Feng, Shenzhen (CN)

(73) Assignee: SHENZHEN BILLDA TECHNOLOGY CO., LTD, Shenzhen (CN)

( * ) Notice: Subject to any disclaimer, the term of this patent is extended or adjusted under 35 U.S.C. 154(b) by 64 days.

(21) Appl. No.: 18/973,282

(22) Filed: Dec. 9, 2024

(65) Prior Publication Data

US 2026/0163607 A1 Jun. 11, 2026

(51) Int. Cl.
*H04B 3/54* (2006.01)
*H02J 9/02* (2006.01)

(52) U.S. Cl.
CPC ................ *H04B 3/548* (2013.01); *H02J 9/02* (2013.01)

(58) Field of Classification Search
CPC ..................................................... H04B 3/548
USPC ........................................................ 375/257
See application file for complete search history.

(56) References Cited

U.S. PATENT DOCUMENTS

2006/0238032 A1* 10/2006 Nitta .................... G11B 19/047 307/64
2014/0203755 A1* 7/2014 Becerra ................ H02M 5/458 318/812

* cited by examiner

*Primary Examiner* — Lihong Yu
(74) *Attorney, Agent, or Firm* — HOWARD M COHN and Associates, LLC

(57) ABSTRACT

Provided is a communication circuit between an emergency power supply and a conventional power supply, including an emergency power supply, a conventional power supply, a sending data line, and a receiving data line, where the sending data line and the receiving data line are connected to the conventional power supply through a communication interface, the sending data line and the receiving data line share one connecting line with a direct current power supply, and the direct current power supply subjected to capacitor rectifier filtering is connected to the communication circuit to achieve double line communication, with fewer connecting lines and without installation errors.

6 Claims, 2 Drawing Sheets

COMMUNICATION CIRCUIT BETWEEN EMERGENCY POWER SUPPLY AND CONVENTIONAL POWER SUPPLY

BACKGROUND OF THE INVENTION

1. Technical Field

The present disclosure relates to the field of power supply apparatuses, particularly to a communication circuit between an emergency power supply and a conventional power supply.

2. Description of Related Art

Electric equipment, for example, an LED lamp, often carries an emergency power supply and a conventional power supply. Carrying the emergency power supply may enable a lamp to be in emergency use in case of power failure. The emergency power supply and the conventional power supply need to communicate with each other to adjust power.

In the prior art, the emergency power supply and the conventional power supply usually communicate with each other by way of bus communication. Their communication lines and power lines are often separately arranged. Therefore, 4 or more connecting lines are needed between the emergency power supply and the conventional power supply. Apparently, the quantity of the connecting lines is great, which will result in a problem of assembly complexity. Emergency power supplies with different brands are still not compatible with the conventional power supply in communication. Therefore, it is an urgent need for a communication circuit between the emergency power supply and the conventional power supply to solve the above problem.

BRIEF SUMMARY OF THE INVENTION

In order to overcome the technical problems that there are many communication connecting lines between the emergency power supply and the conventional power supply, which are hardly assembled, and they are often incompatible in the prior art, the present disclosure provides a solution.

Specifically, the present disclosure provides a communication circuit between an emergency power supply and a conventional power supply, including an emergency power supply and a conventional power supply, and including a sending data line and a receiving data line connected to the emergency power supply, where the sending data line and the receiving data line are connected to the conventional power supply through a communication interface, the sending data line and the receiving data line share one connecting line with a direct current power supply, and the direct current power supply subjected to capacitor rectifier filtering is connected to the communication circuit and is connected to the communication interface.

Preferably, the sending data line includes a first MOS tube (QP13) and a first audion (QP8); a grid electrode of the first MOS tube (QP13) is connected to a Pin TX1 of the emergency power supply, a source electrode thereof is connected to a VDD power supply, and a drain electrode is coupled with a base electrode of the first audion (QP8); and an emitting electrode of the first audion (QP8) is grounded, and a collecting electrode connected in series to a first resistor (RP44) is coupled with a pin 2 of the communication interface (CON8) and is connected to a +12V power supply as well.

Preferably, a second resistor (RP38) is connected in parallel between the base electrode and the emitting electrode of the first audion (QP8), and a first diode (DP8) and a first voltage stabilizing diode (ZD3) are connected in series between the collecting electrode of the first audion (QP8) and the +12V in sequence.

Preferably, the receiving data line includes a second MOS tube (QP12) and a second audion (QP7); a grid electrode of the second MOS tube (QP12) is coupled with the pin 2 of the communication interface (CON8), a source electrode thereof is connected to the +12V power supply, and a drain electrode thereof is coupled with a base electrode of the second audion (QP7); and an emitting electrode of the second audion (QP7) is connected to a pin 1 of the communication interface (CON8), and a collecting electrode is connected to the pin RX1 of the emergency power supply and is connected to a VDD power supply after being connected in series to a third resistor (RP39).

Preferably, a fourth resistor (RP40) is connected in parallel between the base electrode and the emitting electrode of the second audion (QP7).

Preferably, the +12V power supply is coupled with the pin 1 of the communication interface (CON8), and a first capacitor (CP26) is connected between the +12V power supply and the ground.

Preferably, the communication circuit between an emergency power supply and a conventional power supply includes a second diode (DP7), where a cathode of the second diode is coupled with the pin 2 of the communication interface (CON8), and an anode thereof is coupled with a third audion (QP11); an emitting electrode of the third audion (QP11) connected in series to a fifth resistor (RP59) is coupled with a cathode of a third diode (DP6), and a base electrode thereof is grounded after being connected in series to a sixth resistor (RP58) and is connected to an emitting electrode of a fourth audion (QP10) as well; and a base electrode of the fourth audion (QP10) is connected between the fifth resistor (RP59) and the emitting electrode of the third audion (QP11), and an emitting electrode thereof is coupled with an anode of the third diode (DP6) and is connected to the +12V power supply as well.

The present disclosure has the following beneficial effects: compared with the prior art, the present disclosure provides a communication circuit between an emergency power supply and a conventional power supply, including an emergency power supply and a conventional power supply, and a sending data line and a receiving data line connected to the emergency power supply as well, where the sending data line and the receiving data line are connected to the conventional power supply through a communication interface, the sending data line and the receiving data line share one connecting line with a direct current power supply, and the direct current power supply subjected to capacitor rectifier filtering is connected to the communication circuit and is connected to the communication interface. The direct current power supply as a working power supply shares one connecting line with the communication signal to achieve double-line communication, with fewer connecting lines and without installation errors. The communication circuit is suitable for communications between various emergency power supplies and the conventional power supply.

DETAILED DESCRIPTION OF THE INVENTION

In order to express the present disclosure more clearly, the present disclosure will be further described below in conjunction with drawings.

Figure 1:
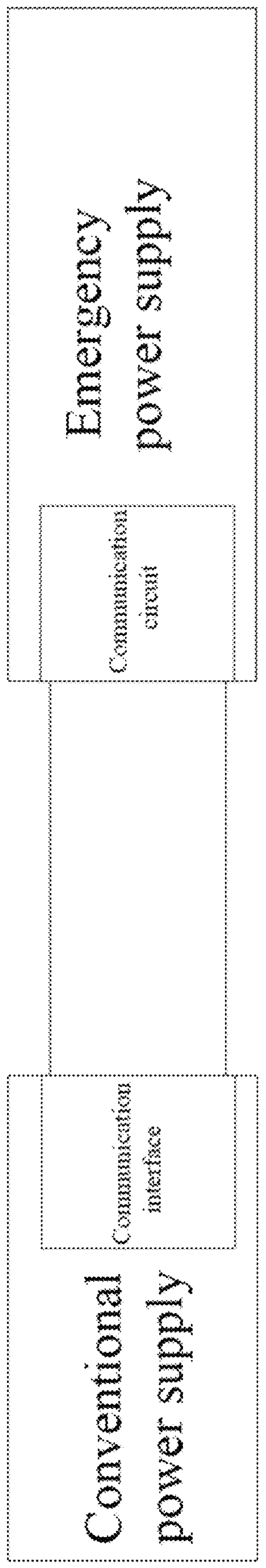
FIG. 1 is a block diagram of a circuit of the present disclosure.
Figure 2:
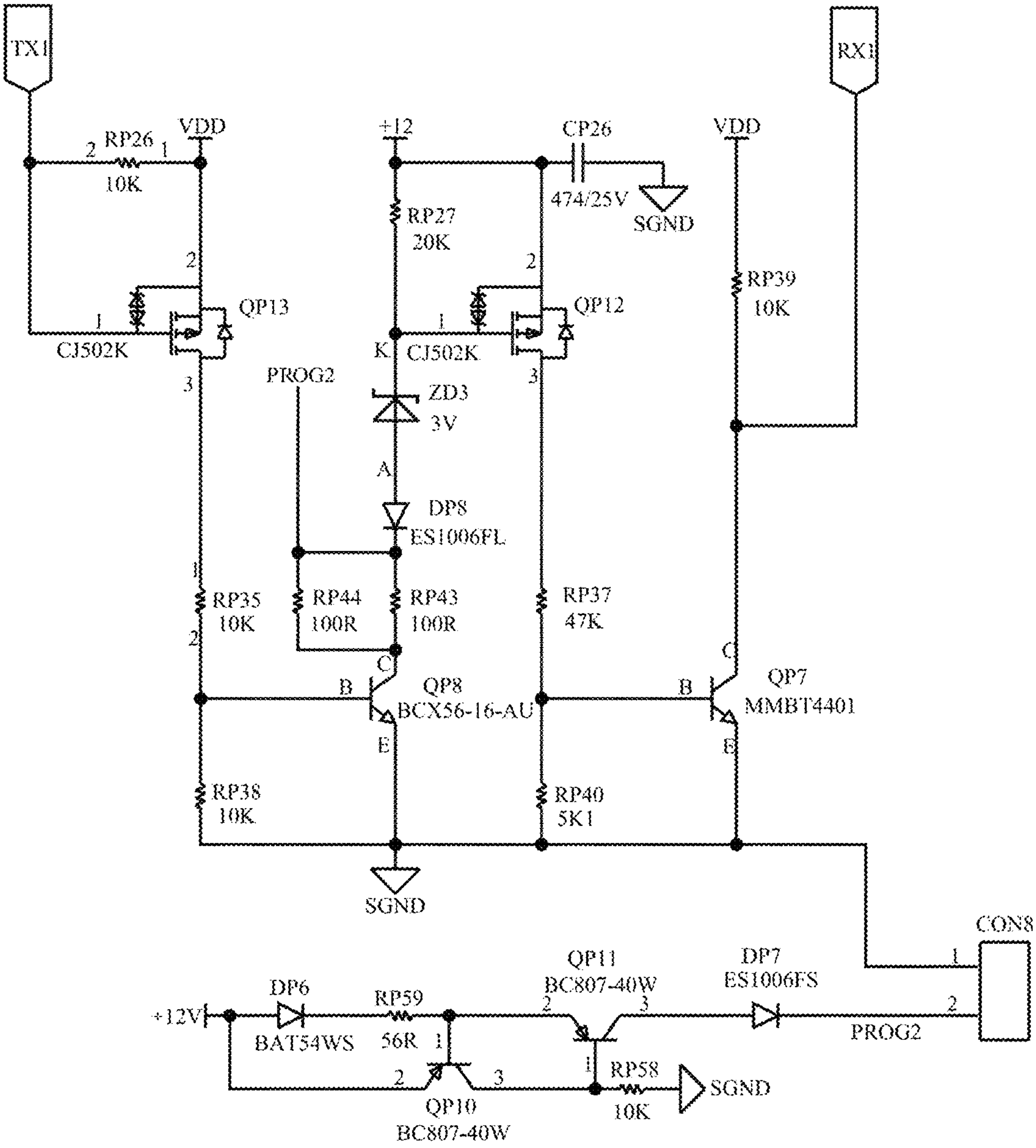
FIG. 2 is a communication circuit diagram of the present disclosure.

Referring to FIGS. 1-2, the present disclosure provides a communication circuit between an emergency power supply and a conventional power supply, including an emergency power supply and a conventional power supply, and including a sending data line and a receiving data line connected to the emergency power supply, where the sending data line and the receiving data line are connected to the conventional power supply through a communication interface, the sending data line and the receiving data line share one connecting line with a direct current power supply, and the direct current power supply subjected to capacitor rectifier filtering is connected to the communication circuit and is connected to the communication interface. The communication signal and the working power supply share one connecting line, which greatly reduces the quantity of the connecting lines between the conventional power supply and the emergency power supply; usually, the communication circuit of the present disclosure is carried on the emergency power supply, and when it matches with conventional power supplies of different modes in use, it may be connected only by replacing the plug matching with the conventional power supplies, so that its compatibility is higher.

In a specific embodiment, as shown in FIG. 2, the sending data line includes a first MOS tube (QP13) and a first audion (QP8); a grid electrode of the first MOS tube (QP13) is connected to a Pin TX1 of the emergency power supply, a source electrode thereof is connected to a VDD power supply, and a drain electrode is coupled with a base electrode of the first audion (QP8); and an emitting electrode of the first audion (QP8) is grounded, and a collecting electrode connected in series to a first resistor (RP44) is coupled with a pin 2 of the communication interface (CON8) and is connected to a +12V power supply as well. Apparently, when the emergency power supply sends data to the conventional power supply, a signal enters the circuit through TX1 to change on-off of the first MOS tube (QP13), so as to change the high and low levels of the first audion (QP8), so that a square wave of the high and low levels is generated in a PROG2 terminal. The conventional power supply may read the data through the pin 2 of the communication interface (CON8).

Further, as shown in FIG. 2, a second resistor (RP38) is connected in parallel between the base electrode and the emitting electrode of the first audion (QP8), and a first diode (DP8) and a first voltage stabilizing diode (ZD3) are connected in series between the collecting electrode of the first audion (QP8) and the +12V in sequence. The second resistor (RP38) may provide a stable biasing current to reduce a temperature-induced variation. The second resistor (RP38) forms a negative feedback, so that the current of the base electrode of the first audion (QP8) is more stable because the pressure drop on the second resistor (RP38) will compensate the influence brought by part of temperature changes, so as to keep the current of the emitting electrode stable. The first diode (DP8) and the first voltage stabilizing diode (ZD3) will also play roles of stabilizing and protecting signals in the circuit, and achieve voltage stabilization and current limitation as well to prevent components and parts of the circuit from being damaged by a too high voltage.

In a specific embodiment, as shown in FIG. 2, the receiving data line includes a second MOS tube (QP12) and a second audion (QP7); a grid electrode of the second MOS tube (QP12) is coupled with the pin 2 of the communication interface (CON8), a source electrode thereof is connected to the +12V power supply, and the drain electrode thereof is coupled with a base electrode of the second audion (QP7); and an emitting electrode of the second audion (QP7) is connected to a pin 1 of the communication interface (CON8), and a collecting electrode is connected to the pin RX1 of the emergency power supply and is connected to a VDD power supply after being connected in series to a third resistor (RP39). It can be seen that when the conventional power supply is to send data to the emergency power supply, the data will generate levels fluctuating up and down through the PROG2 terminal to change on-off of the second MOS tube (QP12), so as to change on-off of the QP7 and generate a square wave at the RX1 terminal. The emergency power supply can receive the data transmitted by the conventional power supply by reading the square wave.

The TX1 and RX1 in the above embodiments both are connected to corresponding pins on a master control chip of the emergency power supply.

Similarly, a fourth resistor (RP40) is connected in parallel between the base electrode and the emitting electrode of the second audion (QP7) to enhance the stability of the current in the circuit and accelerate the consumption of the load of the base electrode, so that the audion is switched fast from a conducting state to a cut-off state, which contributes to shorting the switching time and improving the switching speed and efficiency of the circuit.

In a specific embodiment, the +12V power supply is coupled with the pin 1 of the communication interface (CON8), and a first capacitor (CP26) is connected between the +12V power supply and the ground. In the whole communication circuit, the 12V direct current power supply generated by rectifier filtering provides the working power supply for the whole communication circuit, and moreover, the current is supplied to the conventional power supply through the pin 1 of the communication interface (CON8).

As shown in FIG. 2, in actual use, in view of a possible long connecting line, in order to enhance the carrying capacity of the circuit, in the embodiment, the communication circuit between an emergency power supply and a conventional power supply further includes a second diode (DP7), where a cathode of the second diode is coupled with the pin 2 of the communication interface (CON8), and an anode thereof is coupled with a third audion (QP11); an emitting electrode of the third audion (QP11) connected in series to a fifth resistor (RP59) is coupled with a cathode of a third diode (DP6), and a base electrode thereof is grounded after being connected in series to a sixth resistor (RP58) and is connected to an emitting electrode of a fourth audion (QP10) as well; and a base electrode of the fourth audion (QP10) is connected between the fifth resistor (RP59) and the emitting electrode of the third audion (QP11), and an emitting electrode thereof is coupled with an anode of the third diode (DP6) and is connected to the +12V power supply as well. A constant current circuit is formed to provide a stable current to guarantee that the communication circuit works stably.

In the embodiment, when an electric supply is cut off, the emergency power supply will send a 4 Hz square wave signal to the conventional power supply. Upon receiving the signal, the conventional power supply is switched to the emergency supply to supply electricity. When the electric supply is normal, the emergency power supply sends a 1 Hz square wave signal to the conventional power supply. Upon receiving the signal, the conventional power supply is switched to the conventional power supply to supply electricity; in the embodiment, the duty cycles in the square wave signals all are 20%.

The present disclosure has the following advantages:

1) The direct current power supply and the communication circuit share one connecting line, so that the quantity of the connecting lines is greatly reduced and the installation difficulty is reduced.
2) The first audion and the second audion are connected in series to the resistors, and the diode and the voltage stabilizing diode are connected in series in the circuit, so that the stability of the current and signal of the circuit is guaranteed.
3) By arranging the constant current circuit, the voltage and current are constant, the load and stability of the circuit are improved, and the connecting line can be arranged longer.

The above-disclosed is merely several specific embodiments of the present disclosure, and the present disclosure is not limited thereto. Changes thought by any technical staff in the field shall fall into the protection scope of the present disclosure.

What is claimed is:

1. A communication circuit between an emergency power supply and a conventional power supply, comprising an emergency power supply and a conventional power supply, and comprising a sending data line and a receiving data line connected to the emergency power supply, wherein the sending data line and the receiving data line are connected to the conventional power supply through a communication interface, the sending data line and the receiving data line share one connecting line with a direct current power supply, and the direct current power supply subjected to capacitor rectifier filtering is connected to the communication circuit and is connected to the communication interface;

wherein the sending data line comprises a first MOS tube (QP13) and a first audion (QP8); a grid electrode of the first MOS tube (QP13) is connected to a Pin TX1 of the emergency power supply, a source electrode thereof is connected to a VDD power supply, and a drain electrode is coupled with a base electrode of the first audion (QP8); and an emitting electrode of the first audion (QP8) is grounded, and a collecting electrode connected in series to a first resistor (RP44) is coupled with a pin 2 of the communication interface (CON8) and is connected to a +12V power supply as well.

2. The communication circuit between an emergency power supply and a conventional power supply according to claim 1, wherein a second resistor (RP38) is connected in parallel between the base electrode and the emitting electrode of the first audion (QP8), and a first diode (DP8) and a first voltage stabilizing diode (ZD3) are connected in series between the collecting electrode of the first audion (QP8) and the +12V power supply in sequence.

3. The communication circuit between an emergency power supply and a conventional power supply according to claim 1, wherein the receiving data line comprises a second MOS tube (QP12) and a second audion (QP7); a grid electrode of the second MOS tube (QP12) is coupled with the pin 2 of the communication interface (CON8), a source electrode thereof is connected to the +12V power supply, and a drain electrode thereof is coupled with a base electrode of the second audion (QP7); and an emitting electrode of the second audion (QP7) is connected to a pin 1 of the communication interface (CON8), and a collecting electrode is connected to a pin RX1 of the emergency power supply and is connected to the VDD power supply after being connected in series to a third resistor (RP39).

4. The communication circuit between an emergency power supply and a conventional power supply according to claim 3, wherein a fourth resistor (RP40) is connected in parallel between the base electrode and the emitting electrode of the second audion (QP7).

5. The communication circuit between an emergency power supply and a conventional power supply according to claim 1, wherein the +12V power supply is coupled with a pin 1 of the communication interface (CON8), and a first capacitor (CP26) is connected between the +12V power supply and the ground.

6. The communication circuit between an emergency power supply and a conventional power supply according to claim 5, comprising a second diode (DP7), wherein a cathode of the second diode is coupled with the pin 2 of the communication interface (CON8), and an anode thereof is coupled with a third audion (QP11); an emitting electrode of the third audion (QP11) connected in series to a fifth resistor (RP59) is coupled with a cathode of a third diode (DP6), and a base electrode thereof is grounded after being connected in series to a sixth resistor (RP58) and is connected to an emitting electrode of a fourth audion (QP10); and a base electrode of the fourth audion (QP10) is connected between the fifth resistor (RP59) and the emitting electrode of the third audion (QP11), and an emitting electrode thereof is coupled with an anode of the third diode (DP6) and is connected to the +12V power supply as well.

* * * * *